United States Patent
Walton et al.

[11] Patent Number: 5,852,152
[45] Date of Patent: *Dec. 22, 1998

[54] PACKAGING AND WRAPPING FILM

[75] Inventors: Kim L. Walton; Rajen M. Patel; Pak-Wing Steve Chum, all of Lake Jackson, Tex.

[73] Assignee: The Dow Chemical Company, Midland, Mich.

[*] Notice: The term of this patent shall not extend beyond the expiration date of Pat. No. 5,278,272.

[21] Appl. No.: 487,273

[22] Filed: Jun. 7, 1995

Related U.S. Application Data

[60] Division of Ser. No. 55,063, Apr. 28, 1993, Pat. No. 5,562,958, which is a continuation-in-part of Ser. No. 776,130, Oct. 15, 1991, Pat. No. 5,272,236, and a continuation-in-part of Ser. No. 961,269, Oct. 14, 1992, abandoned, and a continuation-in-part of Ser. No. 24,563, Mar. 1, 1993, abandoned.

[51] Int. Cl.$^6$ .............................. C08F 10/02; C08F 10/14
[52] U.S. Cl. ..................................... 526/348.1; 526/348.2; 526/352; 526/352.2; 526/348.6; 526/943
[58] Field of Search .............................. 526/348.2, 348.6, 526/352, 352.2, 348.1

[56] References Cited

U.S. PATENT DOCUMENTS

| | | | |
|---|---|---|---|
| 5,278,272 | 1/1994 | Lai et al. | 526/348.5 |
| 5,589,561 | 12/1996 | Barry et al. | 526/348.1 |

*Primary Examiner*—Mark Nagumo

[57] ABSTRACT

Biaxially oriented, heat-shrinkable film-making process and film with improved toughness and extrusion processibility are disclosed. The improved film comprises at least one layer of at least one substantially linear ethylene homopolymer or interpolymer, wherein the substantially linear ethylene polymer has an uniform branching distribution, and is also characterized as having essentially no linear polymer fraction, a single DSC melting peak, a density greater than about 0.85 g/cc, and a simple bubble film 1% secant modulus below 195,000 kPa. The biaxially oriented film is characterized as having a simple bubble shrinkage value of from about 18% to about 85% at 135° C. and is useful in preparing heat-shrink bags for packaging food articles like poultry and fresh red meat.

53 Claims, No Drawings

PACKAGING AND WRAPPING FILM

CROSS-REFERENCE TO RELATED APPLICATIONS

This application is a Rule 1.60 divisional of application Ser. No. 08/055,063, filed Apr. 28, 1993, now U.S. Pat. No. 5,562,958 which is a continuation-in-part of pending applications: U.S. Pat. No. 5,272,236, Ser. No. 07/776,130, filed Oct. 15, 1991, in the names of Shih-Yaw Lai, George W. Knight, John R. Wilson, James C. Stevens and Pak-Wing S. Chum; Ser. No. 07/961,269, filed Oct. 14, 1992, now abandoned in the names of Kim L. Walton and Rajen M. Patel; and Ser. No. 08/024,563, filed Mar. 1, 1993, now abandoned in the names of Nicole F. Whiteman, Laura K. Mergenhagen and Pak-Wing Steve Chum, and is related to U.S. Pat. No. 5,278,272, Ser. No. 07/939,281, filed Sep. 2, 1992, in the names of Shih-Yaw Lai, George W. Knight, Tohn R. Wilson and Tames C. Stevens, the disclosures of all of which are incorporated herein by reference.

BACKGROUND OF THE INVENTION

Field of the Invention

This invention relates to an improved plastic packaging or wrapping film, and more particularly, to implosion-resistant shrink, skin, stretch and vacuum wrap films with improved clarity, toughness, extrusion processibility and irradiation cross-link efficiency. The films contain substantially linear ethylene polymers and may be biaxially oriented, multilayered and/or constructed with barrier characteristics.

Technical Background

Food items such as poultry, vegetables, fresh red meat, and cheese, as well as nonfood industrial and retail goods, are packaged by shrink, skin, stretch and/or vacuum wrap methods. The shrink packaging method involves placing an article(s) into a bag fabricated from heat-shrinkable film material, then dosing or heat sealing the bag, and thereafter exposing the bag to sufficient heat to cause shrinking of the bag and intimate contact between the bag and article. The heat can be provided by conventional heat sources, such as heated air, infrared radiation, hot water, combustion flames, or the like. Shrink wrapping of food articles helps preserve freshness, is attractive, hygienic, and allows closer inspection of the quality of the packaged food. Shrink wrapping of industrial and retail goods, which is alternatively referred to in the art and herein as industrial and retail bundling, preserves product cleanliness and also is a convenient means of bundling for accounting purposes.

The skin packaging method involves placing the product to be packaged on porous or perforated paperboard which is typically coated with an adhesive primer, then moving the loaded board to the platen of a skin packaging machine where a skin packaging film is heated until it softens and droops, relaxes and droops a second time over the loaded board. A vacuum then draws the film down around the product to provide a "skin" tight package. Skin packaging serves both the consumer retail and the transit markets. In the transit market, skin packaging protects industrial goods during transport and distribution. In the retail market, skin packaging protects consumer goods against damage and pilferage as well as provides "display appeal" to maximize the sales potential of the packaged product. While most, if not all, nonfood skin packaging film is monolayer, multilayer skin packaging films are useful for protecting food by vacuum packaging and, especially by vacuum skin packaging.

Food items are also packaged by the stretch wrapping method which involves manually pulling a film over a paper pulp or foamed polystyrene tray filled with food (or automatically pushing the tray upward to stretch the film) and then heat sealing the stretched film at its edges usually on the underside of the tray, and allowing the film to remain taut due to its elasticity. For nonfood stretch wrapping, the stretch wrap film is manually or automatically pulled and stretched over and/or around the product, and thereafter the free end of the film is clung or tacked (rather than heat sealed) to another portion of film already wrapped about the product or to the product itself usually by applying pressure in the direction towards the product or goods being wrapped. Stretch wrap packaging of fresh food is specific to the consumer retail market and it allows fresh red meat to bloom to the desired bright red color as well as allows some vegetables to appropriately respire. Stretch wrapping of nonfood items corresponds to the transit market, and includes pallet wrapping of goods as well as wrapping of new vehicles during distribution to protect exterior paint finishes from damage due to add rain, road chips, debris, vandalism, etc.

Whereas stretch wrap packaging typically does not involve barrier film layers and is useful for both food and nonfood items, vacuum packaging involves a gas or oxygen barrier film layer and is generally reserved for red meats, processed meats and cheeses, but is also used to package odor-sensitive or odor-generating nonfood items such as cedar wood chips. There are several methods or variations of vacuum packaging including vacuum skin packaging which is also referred to in the art as vacuum form packaging. One method involves, for example, bringing a heat-softened top and bottom film web together under vacuum in a chamber with the product loaded between the webs; thereafter, heat sealing the webs together at their edges, and then evacuating or gas flushing the space containing the product. In vacuum packaging, typically the bottom web takes up the form of the food item being packaged.

While the shrink wrapping method is predicated on the heat-shrinking properties of the selected film materials, stretch overwrapping is predicated on the elasticity of the film material. Conversely, successful skin packaging is predicated on the adhesion of the film material to the primed board and the amount of time required to cause the film to double droop (cycle time). Similar to skin packaging, successful vacuum packaging depends on the time required for the film webs to sufficiently soften before being drawn by vacuum (or pushed by air pressure) about the product to be packaged. As taught in *Plastics Design and Processing*, November 1980, page 4, film materials with more infra-red heat absorption bands and/or with a lower Vicat softening point will tend to heat-up and soften faster, and thereby allow faster cycle times in skin and vacuum packaging. In general, polar polymers such as, for example, ethylene vinyl acetate (EVA) copolymers, ethylene acrylic acid (EAA) copolymers and ionomers, will possess more infra-red heat bands than nonpolar polymers such as the substantially linear ethylene polymers of the present invention or heterogeneous LLDPE. Further, ionomers show more infra-red heat bands than their respective base copolymers due the ionomerization itself.

Successful packaging or wrapping for all four methods, depends on the toughness and abuse or implosion resistance properties of the film materials themselves such that the packaged product's integrity is maintained during distribution, handling and/or display. However, toughness and abuse resistance are particularly important in food shrink wrapping and vacuum packaging which often times involves packaging of meat and other food cuts with deep cavities and sharp exposed bones as well as exposed edges that can puncture the film webs or fabricated bag during the heat-shrink or vacuuming-form operation or during subsequent package handling and distribution. To avoid premature puncturing, film producers resort to expensive practices to toughen the package such as using thicker films and bags, using an extra layer of film at critical contact points of the bag in a patch-like fashion as described by Ferguson in U.S. Pat. No. 4,755,403, or by using cross-ply or non-parallel layer constructions. Similarly, to "artificially" enhance the puncture and other abuse or implosion resistance characteristics of known film materials, food packagers routinely wrap or cap exposed bone edges with cloth, molded plastic articles or other materials.

An important shrink bundling and skin packaging property, particularly for delicate items or items which tend to crush or bend, such as paper goods, is the tension or force the film exerts on the packaged article and/or board. This attribute is known in the art as shrink tension, and films with too much shrink tension invariably yield shrink or skin packages with unsightly buckling or board curl that-in severe cases can render the packaged good unusable for its intended purpose. In addition to being aesthetically unsightly, buckled or warped goods are difficult to stack uniformly on display shelves.

The film optical properties are also important for retail "point-of-purchase" shrink, skin, stretch and vacuum wrap packages. The better the contact and/or see-through clarity, the lower internal film haze and the higher film gloss or sparkleness, the more likely the package will attract a potential purchaser for closer inspection. Further, consumers generally associate the package aesthetics, which are chiefly predicated on the optical properties of the packaging film, directly with the quality of the article to be purchased.

Another important retail "point-of-purchase" requirement, that is specific to stretch wrapping, is the ability of the film to "snap back" when deformed rather than retain the dents and impressions left from inspections by prospective purchasers. This attribute is predicated on the elastic recovery of the film material, and when elastic recovery is sufficiently high, subsequent prospective purchasers are not unnecessarily prejudiced by the package appearing as if it had been handled and repeatedly rejected.

Still another important film material characteristic, that can affect the overall success of all four packaging and wrapping methods, is the extrusion processibility of the film resin during film fabrication by well known bubble, cast or sheet extrusion methods. Good processibility is manifested as relatively low extrusion energy consumption, a smoother film surface and as a stable bubble or web even at higher blow-up ratios, draw rates and/or film thicknesses. There are numerous benefits of a smoother, more stable film-making operation, including film widths and thicknesses are generally more uniform, the need to edge trim is reduced (which reduces waste), winding and unwinding operations are typically smoother, there are fewer film wrinkles, and the final package quality or appearance is improved.

While high pressure polymerized ethylene homopolymers and copolymers, such as low density polyethylene (LDPE) and ethylene vinyl acetate (EVA) copolymers, generally exhibit good processibility during extrusion as the consequence of having relatively high degrees of long chain branching, linear olefin polymers such as linear low density polyethylene (LLDPE) and ultra low density polyethylene (ULDPE), which is alternatively known in the art as very low density polyethylene (VLDPE), show fair-to-marginal processibility even when fairly sophisticated extrusion screw designs such as barrier screws, screws with Maddock mixing sections, and other like variations are employed to better homogenize or stabilize the polymer melt stream and allow lower energy consumption and smoother polymer surfaces. Further, in attempts to maximize the toughness characteristics of known EVA, ULDPE and LLDPE materials, it is common practice to employ very high molecular weight grades, e.g. melt indices ($I_2$, as measured in accordance with ASTM D-1238 (190° C./2.16 kg)) of $\leq 0.5$ g/10 minutes, which inevitably adds to processibility difficulties.

To meet the diverse performance requirements involved in all four packaging and wrapping methods, various film materials have been used as single components and in blended combinations for both monolayer and multilayer packaging. For example, Smith in U.S. Pat. No. 5,032,463 discloses biaxially stretched monolayer and multilayer films comprising blends of ethylene/1-butene ultra low density polyethylene and ethylene/1-hexene ultra low density polyethylene.

As another example, Lustig et al. in U.S. Pat. No. 5,059,481 describe biaxially oriented ultra low density polyethylene monolayer and multilayer packaging films with a barrier core layer, an ethylene/vinyl acetate intermediate layer and ULDPE/EVA blends as the outer layer. In U.S. Pat. No. 4,863,769, Lustig et al. disclose the use these biaxially oriented ultra low density films as bags for packaging frozen poultry, and in U.S. Pat. No. 4,976,898, Lustig et al. disclose that the "double bubble" method can be used to prepare the biaxially oriented ultra low density polyethylene films.

In another example, Botto et al. in European Patent Application 0.243 510 describes a multilayer skin packaging film consisting of an ionomer, EVA and HDPE that is particularly useful for vacuum skin packaging of food.

While prior art film materials have varying degrees of toughness, implosion resistance, low temperature shrinking characteristics, and bag making heat sealing performances, even tougher film materials are desired in shrink, skin and vacuum packaging for reduced bag punctures or for maintaining puncture resistance levels when down-gauging film thicknesses for environmental source reduction purposes, cost-effectiveness or other considerations. Moreover, while low density polyethylene (LDPE) produced via free radical, high pressure polymerization of ethylene performs satisfactorily in industrial (transit) shrink and skin packaging applications, the optical properties of LDPE generally are not satisfactory for consumer retail packaging applications and in the instance of retail skin packaging, packagers are left to rely on expensive film materials, such as Surlyn™ ionomers supplied by E. I duPont, for the desired optical appeal. However, even the expensive ionomer products show skin packaging deficiencies such as poor biaxial tear/cut resistance and insufficient drawability that can yield aesthetically unpleasing ridges and/or bridges when multiple items are packaged on a single paperboard.

Although having poor tear/cut resistance in both the machine and transverse directions is clearly an ionomer disadvantage, there is benefit to reduced tear/cut resistance in one direction or another, i.e., to facilitate easy opening of the package while maintaining its tamper-evident quality.

The search for an alternative to polyvinyl chloride (PVC) films for stretch wrap for food is another example of packagers having to rely on expensive film materials. Such alternatives have typically been olefin multilayer film. The search is impartant, however, because PVC has undesirable plasticizer migration tendencies as well as a growing environmental concern regarding chlorinated polymers in general. While various multilayer films have been disclosed (for example, in U.S. Pat. No. 5,112,674 and U.S. Pat. No. 5,006,398, and in EPO 0 243 965, EPO 0 333 508, and EPO 0 404 969) with similar snap-back or elastic recovery as PVC, many of these solutions involve coextrusions with ethylene copolymers such as ethylene vinyl acetate (EVA) and ethylene acrylic acid (EAA) copolymers. Use of these polar copolymers presents processing limitations including thermal stability and recycle/trim incompatibility.

Another desired improvement over known olefin polymers is disclosed in EPO 0 404 368 where Ziegler catalyzed ethylene α-olefin copolymers, such as ethylene/1-butene, ethylene/1-hexene, and ethylene/1-octene copolymers are shown to require blending with LDPE to provide film materials with adequate shrink properties (especially in the cross direction) when processed via simple blown film extrusion.

In providing film materials with improved toughness and abuse or implosion resistance characteristics for shrink packaging, good low temperature heat-shrink performance in both the machine and cross directions must also be provided. Also, for shrink and skin packages void of excessive curl or warpage, shrink tension must be maintained at a low level, and to achieve the desired free shrink characteristics, the film material must possess the morphology and be strong enough to withstand the physical biaxial stretching that occurs during film fabrication in the simple bubble extrusion process or in more elaborate processes such as the double bubble process described by Pahlke in U.S. Pat. No. 3,555,604, the disclosure of which is incorporated herein by reference. Improved film materials must also exhibit good processibility and optical properties relative to known film materials, and particularly, relative to the very low density polyethylene (VLDPE) materials and films disclosed by Lustig et al. in U.S. Pat. No. 5,059,481; U.S. Pat. No. 4,863,769; and U.S. Pat. No. 4,976,898.

Mitsui Petrochemical has been selling products prepared by polymerizing ethylene and an α-olefin under the trademark "Tafmer TM™" for more than a decade that are considered to be a class of very low modulus materials. Some of the Tafmer™ grades have been marketed for use in multilayer film packaging structures. For example, U.S. Pat. No. 4,429,079 (Shibata et al.) assigned to Mitsui Petrochemical Industries, the disclosure of which is incorporated herein by reference, discloses a composition in which a random ethylene copolymer (conventional LLDPE having one, two or more melting points from 115° C. to 130° C. labeled as component (A) is blended with another random ethylene copolymer (one having a single melting point from 40° C. to 100° C.), labeled as component (B) to provide compositions where component (B) does not exceed 60 percent by weight of the total composition with improved properties, in particular, improved low-temperature heat sealability and flexural toughness for resisting pinhole formation during handling. However, with excellent heat sealability and flexibility notwithstanding, Tafmer™ products are not generally recognized or marketed as having excellent abuse resistance properties and shrink characteristics. The Tafmer™ products having a single melting point are homogeneously branched linear polyethylenes which were earlier described by Elston in U.S. Pat. No. 3,645,992 and are made by a related polymerization process using vanadium catalysts.

Exxon Chemical Company has recently introduced products similar to Mitsui Petrochemical's Tafmer™ products which Exxon prepared by polymerizing ethylene and an α-olefin (e.g., 1-butene n)-hexene) in the presence of a single site metallocene catalyst. In a paper presented on Sep. 22–27, 1991 at the 1991 IEEE Power Engineering Society Transmission and Distribution Conference ("New Specialty Linear Polymers (SLP) For Power Cables", printed in the proceedings on pp. 184–190) in Dallas, Tex., Monica Hendewerk and Lawrence Spenadel, of Exxon Chemical Company, reported that Exxon's Exact™ polyolefins polymers, said to be produced using single site metallocene catalyst technology, are useful in wire and cable coating applications. Also, in the 1991 *Polymers, Laminations & Coatings Conference Proceedings*, pp. 289–296 ("A New Family of Linear Ethylene Polymers Provides Enhanced Sealing Performance" by Dirk G. F. Van der Sanden and Richard W. Halle, (also published in February 1992 TAPPI Journal)), and in *ANTEC '92 Proceedings*, pp. 154–158 ("Exact™ Linear Ethylene Polymers for Enhanced Sealing Performance" by D. Van der Sanden and R. W. Halle) Exxon Chemical describe their new narrow molecular weight distribution polymers made using a single site metallocene catalyst as "linear backbone resins containing no functional or long chain branches." Films made from the polymers produced by Exxon are also said to have advantages in sealing characteristics as measured by hot-tack and heat-seal curves, but these publications do not discuss shrink characteristics. The new Exxon polymers are said to be linear and to have narrow molecular weight distributions, and, because of the narrow molecular weight distribution, are also said to have "the potential for melt fracture." Exxon Chemical acknowledged that "it is well known that narrow-MWD polymers are somewhat more difficult to process".

Accordingly, although new materials have been recently developed and marketed for flexible packaging or wrapping purposes, the need still exists for improved olefin packaging films and bags or wraps fabricated therefrom, with particular improvement needed in regard to recovery, shrink characteristics, vacuum drawability abuse or implosion resistance and processibility relative to the VLDPE olefin polymers with linear backbones such as those described by Lustig et al. in U.S. Pat. No. 4,863,769; U.S. Pat. No. 4,976,898 and U.S. Pat. No. 5,059,481.

SUMMARY OF THE INVENTION

In accordance with the present invention, we have discovered a new and improved (A) olefin wrapping or packaging film comprising an ethylene polymer that may be biaxially oriented, irradiation crosslinked and/or multilayered with a barrier film layer, (B) method of manufacturing a biaxially oriented olefin wrapping or packaging film comprising the steps of extruding a primary tube comprising an ethylene polymer; heating the ethylene polymer primary tube; biaxially orienting the heated primary tube using a double bubble method, and optionally irradiating the ethylene polymer before or after biaxial orientation step, (D) method of manufacturing a biaxially oriented olefin wrapping or packaging film comprising the steps of (a) extruding a primary tube comprising an ethylene polymer; (b) biaxially orienting the heated primary tube using a high blow-up ratio (BUR) technique, and (c) optionally, irradiating the ethylene polymer before or after the biaxial orientation step, (E) olefin wrapping or packaging film suitable for use in fabricating bags and wraps for packaging food and nonfood articles by the shrink, skin, stretch and vacuum packaging methods, wherein said film comprises an ethylene polymer, These improvements are achieved by using a film structure comprising at least one film layer containing at least one substantially linear ethylene polymer which is characterized as having:

i. a melt flow ratio, $I_{10}/I_2$, $\leq 5.63$, ii. a molecular weight distribution, $M_w/M_n$, defined by the equation: $M_w/M_n \leq (I_{10}/I_2) - 4.63$, and iii. a critical shear rate at the onset of surface melt fracture of at least 50 percent greater that the critical shear rate at the onset of surface melt fracture of a linear olefin polymer having about the same $I_2$ and $M_w/M_n$.

The new films represent, in particular, an improvement over the film, the film-making method and the packaging bag or wrap disclosed by Lustig et al. in U.S. Pat. No. 5,059,481; U.S. Pat. No. 4,863,769; and U.S. Pat. No. 4,976,898; by Smith in U.S. Pat. No. 5,032,463; by Parnell et al. in U.S. Pat. No. 5,041,316 and by Quacquarella et al. in U.S. Pat. No. 4,801,486.

DESCRIPTION OF THE PREFERRED EMBODIMENTS

The substantially linear ethylene homopolymers and interpolymers used in the present invention are a unique class of compounds that are further defined in copending application Ser. No. 07/776,130 filed Oct. 15, 1991 now U.S. Pat. No. 5,272,236 and in copending application Ser. No. 07/939,281 filed Sep. 2, 1992, now U.S. Pat. No. 5,278,272 each of which is incorporated herein by reference.

These unique substantially linear ethylene homopolymers and interpolymers are not in the same class as the conventional homogeneously branched linear ethylene/α-olefin copolymers described in U.S. Pat. No. 3,645,992 (Elston) nor are they in the same class as conventional Ziegler polymerized linear ethylene/α-olefin copolymers (e.g., linear low density polyethylene or linear high density polyethylene made, for example, using the technique disclosed by Anderson et al. in U.S. Pat. No. 4,076,698, incorporated herein by reference), nor are they in the same class as traditional highly branched low density polyethylene (i.e., LDPE). The substantially linear ethylene homopolymers and interpolymers useful in this invention have excellent processability, even though they have relatively narrow molecular weight distributions and exhibit good shrink characteristics when biaxially stretched or oriented by the less elaborate simple bubble fabrication method. Even more surprisingly, the melt flow ratio ($I_{10}/I_2$) of the substantially linear ethylene homopolymers or interpolymers can be varied essentially independently of the polydispersity index (i.e., the molecular weight distribution, $M_w/M_n$). This behavior is a contradistinction to the linear ethylene/α-olefin copolymers described by Elston and to the conventional Ziegler polymerized linear polyethylene copolymers having rheological properties such that as the polydispersity index increases, the $I_{10}/I_2$ value also increases.

The term "substantially linear" means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Long chain branching is defined herein as a chain length of at least about 6 carbons, above which the length cannot be distinguished using $^{13}C$ nuclear magnetic resonance spectroscopy, yet the long chain branch can be about the same length as the length of the polymer back-bone.

Long chain branching is determined by using $^{13}C$ nuclear magnetic resonance (NMR) spectroscopy and is quantified using the method described by Randall (*Rev. Macromol. Chem. Phys.*, C29, V. 2&3, p. 285–297), the disclosure of which is incorporated herein by reference.

The substantially linear homopolymers for use in making the improved biaxially oriented, heat-shrinkable film and bag of the present invention are polymers of ethylene involving no additional monomer or comonomer although at least one chain transfer agent may be employed to affect polymer molecular characteristics. The substantially linear ethylene interpolymers for use in making the improved biaxially oriented, heat-shrinkable film of the present invention are interpolymers of ethylene with at least one $C_3$–$C_{20}$ α-olefin and/or $C_4$–$C_{18}$ diolefin. Copolymers of ethylene and an α-olefin of $C_3$–$C_{20}$ carbon atoms are especially preferred. The term "interpolymer" is used herein to indicate a copolymer, or a terpolymer, or the like, where, at least one other comonomer is polymerized with ethylene to make the interpolymer.

Suitable unsaturated comonomers useful for polymerizing with ethylene include, for example, ethylenically unsaturated monomers, conjugated or non-conjugated dienes, polyenes, etc. Examples of such comonomers include $C_3$–$C_{20}$ α-olefins as propylene, isobutylene, 1-butene, 1-hexene, 4-methyl-1-pentene, 1-heptene, 1-octene, 1-nonene, 1-decene, and the like. Preferred comonomers include propylene, 1-butene, 1-hexene, 4-methyl-1-pentene and 1-octene, and 1-octene is especially preferred. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

The density of the substantially linear ethylene interpolymers or homopolymers (as measured in accordance with ASTM D-792) for use in the present invention is generally greater than about 0.85 g/cc, especially from about 0.86 g/cc to about 0.93 g/cc, and more preferably, from about 0.88 g/cc to about 0.92 g/cc.

The molecular weight of the substantially linear ethylene interpolymers or homopolymers is conveniently indicated using a melt index measurement according to ASTM D-1238, Condition 190° C./2.16 kg (formerly known as "Condition E" and also known as $I_2$). Melt index is inversely proportional to the molecular weight of the polymer. Thus, the higher the molecular weight, the lower the melt index, although the relationship is not linear. The melt index for the substantially linear ethylene interpolymers and homopolymers useful herein is generally from about 0.01 g/10 min. to about 10 g/10 min., preferably from about 0.01 g/10 min. to about 3 g/10 min., and especially from about 0.1 g/10 min. to about 2 g/10 min.

Other measurements useful in characterizing the molecular weight of substantially linear ethylene interpolymers and homopolymers involve melt index determinations with higher weights, such as, for common example, ASTM D-1238, Condition 190° C./10 kg (formerly known as "Condition N" and also known as $I_{10}$). The ratio of a higher weight melt index determination to a lower weight determination is known as a melt flow ratio, and for measured $I_{10}$ and the $I_2$ melt index values the melt flow ratio is conveniently designated as $I_{10}/I_2$. For the substantially linear ethylene interpolymers and homopolymers used to prepare the films of the present invention, the melt flow ratio indicates the degree of long chain branching, i.e., the higher the $I_{10}/I_2$ melt flow ratio, the more long chain branching in the polymer. The $I_{10}/I_2$ ratio of the substantially linear ethylene interpolymers and homopolymers is preferably at least about 7, and especially at least about 9.

Additives such as antioxidants (e.g., hindered phenolics (such as Irganox® 1010 or Irganox® 1076), phosphites (e.g., Irgafos® 168), cling additives (e.g., PIB), PEPQ™ (a trademark of Sandoz Chemical, the primary ingredient of which is believed to be a biphenylphosphonite), pigments, colorants, fillers, and the like can also be included in the interpolymers and copolymers, to the extent that they do not interfere with the enhanced film properties discovered by Applicants. The fabricated film may also contain additives to enhance its antiblocking and coefficient of friction characteristics including, but not limited to, untreated and treated silicon dioxide, talc, calcium carbonate, and clay, as well as primary and secondary fatty acid amides, silicone coatings, etc. Other additives to enhance the film's anti-fogging characteristics may also be added, as described, for example, in U.S. Pat. No. 4,486,552 (Niemann), the disclosure of which is incorporated herein by reference. Still other additives, such as quatenary ammonium compounds alone or in combination with EAA or other functional polymers, may also be added to enhance the film's antistatic characteristics and allow packaging of electronically sensitive goods.

The substantially linear ethylene interpolymers or homopolymers used to prepare the olefin packaging and wrapping films of the present invention can be used as the only resinous polymer component of the film whether the structure to be used is a monolayer or multilayer construction. Other polymers can also be blended with the substantially linear ethylene interpolymers or homopolymers to modify the film processing, film strength, heat seal, or adhesion characteristics. Packaging and wrapping films made with appropriate blends of the substantially linear ethylene interpolymers or homopolymers and other polymer components maintain enhanced performance and in specific instances can offer improved combinations of properties. Some useful materials for blending with substantially linear ethylene interpolymers and homopolymers include, for example, but are not limited to, high pressure low density polyethylene (LDPE), ethylene/vinyl acetate copolymer (EVA), ethylene/carboxylic acid copolymers and ionomers thereof, polybutylene (PB), and α-olefin polymers such as high density polyethylene, medium density polyethylene, polypropylene, ethylene/propylene interpolymers, linear low density polyethylene (LLDPE) and ultra low density polyethylene, as well as graft-modified polymers, and combinations thereof including density, MWD, and/or comonomer combinations such as those disclosed, for example, by Smith in U.S. Pat. No. 5,032,463 which is incorporated herein by reference. However, preferably the substantially linear ethylene interpolymer or homopolymer comprise at least about 50 percent of the blend composition, more preferably at least about 80 percent of the blend composition. Highly preferably, though, for multilayer film constructions, the outer film layers (alternatively referred to in the art as "skin layers" or "surface layers") and the sealant layers would consist essentially of the substantially linear ethylene interpolymer and/or homopolymer.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99, both publications of which are incorporated by reference herein in their entirety. GER experiments are performed at a temperature of 190° C., at nitrogen pressures between 250 to 5500 psig using about a 0.754 mm diameter, 20:1 L/D die with an entrance angle of 180°. For the substantially linear ethylene polymers described herein, the PI is the apparent viscosity (in kpoise) of a material measured by GER at an apparent shear stress of $2.15 \times 10^6$ dyne/cm². The novel substantially linear ethylene interpolymers and homopolymers described herein preferably have a PI in the range of about 0.01 kpoise to about 50 kpoise, preferably about 15 kpoise or less. The novel substantially linear substantially linear ethylene interpolymers and homopolymers described herein have a PI less than or equal to about 70% of the PI of a comparative linear ethylene polymer (either a Ziegler polymerized polymer or a linear uniformly branched polymer as described by Elston in U.S. Pat. No. 3,645,992) at about the same $I_2$ and $M_w/M_n$.

An apparent shear stress versus apparent shear rate plot is used to identify the melt fracture phenomena. According to Ramamurthy in the *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." In this disclosure, the onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene interpolymers and homopolymers is at least 50 percent greater than the critical shear rate at the onset of surface melt fracture of a comparative linear ethylene polymer (either a Ziegler polymerized polymer or a linear uniformly branched polymer as described by Elston in U.S. Pat. No. 3,645,992) having about the same $I_2$ and $M_w/M_n$.

Gross melt fracture occurs at unsteady extrusion flow conditions and ranges in detail from regular (alternating rough and smooth, helical, etc.) to random distortions. For commercial acceptability, (e.g., in blown films and bags therefrom), surface defects should be minimal, if not absent, for good film quality and properties. The critical shear stress at the onset of gross melt fracture for the substantially linear ethylene interpolymers and homopolymers used in making the biaxially oriented, heat-shrinkable film of the present invention is greater than about $4 \times 10^6$ dynes/cm². The critical shear rate at the onset of surface melt fracture (OSMF) and the onset of gross melt fracture (OGMF) will be used herein based on the changes of surface roughness and configurations of the extrudates extruded by a GER.

The distribution of comonomer branches for the substantially linear ethylene interpolymers and homopolymers is characterized by its SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), or in U.S. Pat. No. 4,798,081, both disclosures of which are incorporated herein by reference. The SCBDI or CDBI for the substantially linear interpolymers and homopolymers of the present invention is preferably greater than about 30 percent, especially greater than about 50 percent.

The substantially linear ethylene interpolymers and homopolymers used in this invention essentially lack a measurable "high density" fraction as measured by the TREF technique. The substantially linear interpolymers and copolymers do not contain a polymer fraction with a degree of branching less than or equal to 2 methyls/1000 carbons. The "high density polymer fraction" can also be described as a polymer fraction with a degree of branching less than about 2 methyls/1000 carbons. Among other benefits, the lack of high density polymer fraction permits improved optical properties and enhanced film flexibility.

Molecular Weight Distribution Determination: The substantially linear ethylene interpolymers and homopolymers are analyzed by gel permeation chromatography (GPC) on a Waters 150 high temperature chromatographic unit equipped with differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which 0.3 percent by weight solutions of the samples are prepared for injection. The flow rate is 1.0 milliliters/minute, unit operating temperature is 140° C. and the injection size is 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*. Polymer Letters, Vol. 6, p. 621, 1968, incorporated herein by reference) to derive the following equation:

Mpolyethylene=a*(Mpolystyrene)$^b$.

In this equation, a=0.4316 and b=1.0. Weight average molecular weight, $M_w$, is calculated in the usual manner according to the following formula: $M_w=\Sigma wi*M_i$, where wi and $M_i$ are the weight fraction and molecular weight, respectively, of the i$^{th}$ fraction eluting from the GPC column.

For the substantially linear ethylene interpolymers and homopolymers used in the present invention, the $M_w/M_n$ is preferably less than about 3, especially from about 1.5 to about 2.5.

The Substantially Linear Ethylene Interpolymers and Homopolymers: Single site polymerization catalysts, (e.g., the monocyclo-pentadienyl transition metal olefin polymerization catalysts described by Canich in U.S. Pat. No. 5,026,798 or by Canich in U.S. Pat. No. 5,055,438, the disclosures of which are both incorporated herein by reference) or constrained geometry catalysts (e.g., as described by Stevens et al. in U.S. Pat. No. 5,064,802, incorporated herein by reference) can be used to polymerize the substantially linear interpolymers and copolymers, so long as the catalysts are used consistent with the methods described in U.S. Ser. No. 07/776,130, now U.S. Pat. No. 5,271,236 and in U.S. Ser. No. 07/939,281, now U.S. Pat. No. 5,278,272. Such polymerization methods are also described in PCT/US 92/08812 (filed Oct. 15, 1992), the disclosure of which is incorporated herein by reference. However, the substantially linear ethylene interpolymers and homopolymers are preferably made by using suitable constrained geometry catalysts, especially constrained geometry catalysts as disclosed in U.S. application Ser. Nos.: 545,403, filed Jul. 3, 1990, pending; 758,654, filed Sep. 12, 1991, now U.S. Pat. No. 5,132,380; 758,660, filed Sep. 12, 1991, now abandoned; and 720,041, filed Jun. 24, 1991, now abandoned the teachings of all of which are incorporated herein by reference.

Suitable cocatalysts for use herein include but are not limited to, for example, polymeric or oligomeric aluminoxanes, especially methyl aluminoxane or modified methyl aluminoxane (made, e.g., as described in U.S. Pat. No. 5,041,584, U.S. Pat. No. 4,544,762, U.S. Pat. No. 5,015,749, and/or U.S. Pat. No. 5,041,585, the disclosures of each of which are incorporated herein by reference) as well as inert, compatible, non-coordinating, ion forming compounds. Preferred cocatalysts are inert, non-coordinating, boron compounds.

Preparation of the Substantially Linear Ethylene Polymer: The polymerization conditions for manufacturing the substantially linear ethylene homopolymers and interpolymers of the present invention are preferably those useful in the solution polymerization process, although the application of the present invention is not limited thereto. Slurry and gas phase polymerization processes are also useful, provided the proper catalysts and polymerization conditions are employed. To polymerize the substantially linear interpolymers and copolymers useful in the invention, the single site and constrained geometry catalysts mentioned earlier can be used, but the polymerization process should be operated such that the polymers are formed. That is, not all polymerization conditions inherently make the substantially linear ethylene polymers, even when the same catalysts are used.

For example, in one embodiment of a polymerization process useful in making the novel substantially linear ethylene polymers, a continuous process is used, as opposed to a batch process.

Preferably, the polymerization is performed in a continuous solution polymerization process. Generally, manipulation of $I_{10}/I_2$ while holding $M_w/M_n$ relatively low for producing the substantially linear ethylene polymers using constrained geometry catalyst technology described herein is a function of reactor temperature and/or ethylene concentration. Reduced ethylene concentration and higher temperature generally produces higher $I_{10}/I_2$. Generally, as the ethylene concentration of the reactor decreases, the polymer concentration increases. For the novel substantially linear ethylene interpolymers and homopolymers, the polymer concentration for a continuous solution polymerization process is preferably above about 5 weight percent of the reactor contents, especially above about 6 weight percent of the reactor contents. Generally, the polymerization temperature of the continuous process, using constrained geometry catalyst technology, is from about 20° C. to about 250° C. If a narrow molecular weight distribution polymer ($M_w/M_n$ of from about 1.5 to about 2.5) having a higher $I_{10}/I_2$ ratio (e.g. $I_{10}/I_2$ of about 7 or more, preferably at least about 8, especially at least about 9) is desired, the ethylene concentration in the reactor is preferably not more than about 8 percent by weight of the reactor contents, especially not more than about 6 percent by weight of the reactor contents, and most especially not more than about 4 percent by weight of the reactor contents.

Multiple reactor polymerization processes can also be used in making the substantially linear olefin interpolymers and homopolymers of the present invention, such as those processes disclosed in U.S. Pat. No. 3,914,342, incorporated herein by reference. The multiple reactors can be operated in series or in parallel or a combination thereof, with at least one constrained geometry catalyst employed in at least one of the reactors.

Suitable Film Structures: Film structures of the present invention can be made using conventional simple bubble or cast extrusion techniques as well as by using more elaborate techniques such as "tenter framing" or the "double bubble" or "trapped bubble" process.

"Stretched" and "oriented" are used in the art and herein interchangeably, although orientation is actually the consequence of a film being stretched by, for example, internal air pressure pushing on the tube or by a tenter frame pulling on the edges of the film.

Simple blown bubble film processes are described, for example, in *The Encyclopedia of Chemical Technology*, Kirk-Othmer, Third Edition, John Wiley & Sons, New York, 1981, Vol. 16, pp. 416–417 and Vol. 18, pp. 191–192, the disclosures of which are incorporated herein by reference. Processes for manufacturing biaxially oriented film such as the "double bubble" process described in U.S. Pat. No. 3,456,044 (Pahlke), and other suitable processes for preparing biaxially stretched or oriented film are described in U.S. Pat. No. 4,865,902 (Golike et al.), U.S. Pat. No. 4,352,849 (Mueller), U.S. Pat. No. 4,820,557 (Warren), U.S. Pat. No. 4,927,708 (Herran et al.), U.S. Pat. No. 4,963,419 (Lustig et al.), and U.S. Pat. No. 4,952,451 (Mueller), the disclosures of each of which are incorporated herein by reference.

As disclosed by Pahlke in U.S. Pat. No. 3,456,044 and in comparison to the simple bubble method, "double bubble" or "trapped bubble" film processing can significantly increase a film's orientation in both the machine and transverse directions. The increased orientation yields higher free shrinkage values when the film is subsequently heated. Also, Pahlke in U.S. Pat. No. 3,456,044 and Lustig et al. in U.S. Pat. No. 5,059,481 (incorporated herein by reference) disclose that low density polyethylene and ultra low density polyethylene materials, respectively, exhibit poor machine and transverse shrink properties when fabricated by the simple bubble method, e.g., about 3% free shrinkage in both directions. However, in contrast to known film materials, and particularly in contrast to those disclosed by Lustig et al. in U.S. Pat. No. 5,059,481; U.S. Pat. No. 4,976,898; and U.S. Pat. No. 4,863,769, as well as in contrast to those disclosed by Smith in U.S. Pat. No. 5,032,463 (the disclosures of which are incorporated herein by reference), the unique substantially linear ethylene polymers of the present invention show significantly improved simple bubble shrink characteristics in both the machine and transverse directions. Additionally, when the unique substantially linear ethylene polymers are fabricated by simple bubble method at high blow-up ratios, e.g., at greater or equal to 2.5:1, or, more preferably, by the "double bubble" method disclosed by Pahlke in U.S. Pat. No. 3,456,044 and by Lustig et al. in U.S. Pat. No. 4,976,898, it is possible to achieve good machine and transverse direction shrink characteristics making the resultant films suitable for shrink wrap packaging purposes. Blow-Up Ratio, abbreviated herein as "BUR", is calculated by the equation:

BUR=Bubble Diameter÷Die Diameter.

The olefin packaging and wrapping films of the present invention may be monolayer or multilayer films. In those embodiments in which the film structure is a monolayer, the monolayer can comprise at least about 50, preferably at least about 75, weight percent of at least one substantially linear ethylene polymer, up to 100 weight percent of at least one substantially linear ethylene polymer.

The substantially linear ethylene polymer used to construct the monolayer will depend on the properties desired in the film and in those embodiments in which two or more substantially linear ethylene polymers are used in the construction of the film, these polymers are selected in part based on their compatibility with one another with respect to both processing and use conditions. Similarly, if a blend of one or more substantially linear ethylene polymers and one or more non-substantially linear ethylene polymers (e.g. conventional, homogeneously branched linear ethylene/α-olefin copolymers made as described in U.S. Pat. No. 3,645,992, or conventional, heterogeneously branched ethylene/α-olefin copolymers made by the Ziegler process as described in U.S. Pat. No. 4,076,698, both disclosures of which are incorporated herein by reference) are used in the construction of the monolayer, then these non-substantially linear ethylene polymers are selected in part based on their compatibility with the substantially linear ethylene polymer(s).

Depending on their various properties, any of these monolayers can be used in any of the four various packaging methods, but as a practical matter, monolayer films are best adapted for use in the stretch overwrap and skin packaging method. As required for stretch wrapping, monolayer film made from the substantially linear ethylene polymers of the present invention have surprisingly good oxygen permeability. For example, a 2-mil monolayer blown film made from a substantially linear ethylene interpolymer at about 9 weight % 1-octene content has an oxygen transmission rate of about 720 cc/mil/(100 in$^2$/day/atm), which is about 15–20 percent greater than the oxygen transmission of a 2-mil monolayer blown film made from a comparative heterogeneously branched LLDPE (also an ethylene/1-octene copolymer having about 9 weight % 1-octene content) which has an oxygen transmission of about 590 cc/mil/100 in$^2$/day/atm. The α-olefin comonomer content in the substantially linear ethylene polymers can be determined by infrared techniques, (ASTM D-2238 Method B).

Oxygen transmission is particularly beneficial in stretch wrap packaging of individual cuts of red meat (i.e., "in-store" wrapped meat where the grocer/butcher actually cuts the primal meat into smaller cuts for individual sale), where oxygen permeability allows fresh red meat to "bloom" to the desired bright red color. Film useful in packaging individual cuts of red meat will usually have minimal shrinkage and good stretchability. The film preferably is oxygen permeable and has good elastic recovery, to enable the consumer to examine the meat without permanently deforming the film and making it unattractive. Co-pending application entitled "Method of Packaging Food Products", filed of even date herewith in the names of Pak-Wing Steve Chum and Nicole F. Whiteman, the disclosure of which is incorporated herein by reference, discloses methods of wrapping food articles, including such individual portions of red meat. The film used in packaging individual portions of red meat, could, however, be prepared as a heat-shrinkable film, even though current technology does not utilize shrink characteristics.

One particularly desirable monolayer for use in the stretch overwrap method is a blend of substantially linear olefin polymer and an ethylene/(α,β-unsaturated carbonyl copolymer such as EVA, EAA, ethylene/methacrylic add (EMAA), and their alkali metal salts (ionomers), esters and other derivatives.

For coextruded or laminated multilayer film structures (e.g., 3 and 5-layer film structures), the substantially linear ethylene polymer described herein can be used as a core layer, an outer surface layer, an intermediate layer and/or a inner sealant layer of the structure. Generally for a multilayer film structure, the substantially linear ethylene interpolymers or homopolymers described herein comprise at least 10 percent of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terepthalate (PET), oriented polypropylene (OPP), ethylene/vinyl acetate (EVA) copolymers, ethylene/acrylic acid (EAA) copolymers, ethylene/methacrylic add (EMAA) copolymers, ULDPE, LLDPE, HDPE, MDPE, LMDPE, LDPE, ionomers, graft-modified polymers (e.g., maleic anhydride grafted polyethylene), and paper. Generally, the multilayer film structures comprise from 2 to about 7 layers.

In one embodiment disclosed herein, a multilayer film structure comprising at least three layers (e.g., an "A/B/A" structure), wherein each outer layer comprises at least one substantially linear ethylene polymer, and at least one core or hidden layer is a high pressure branched low density polyethylene (LDPE). This multilayer film structure shows surprisingly good optical properties, while maintaining good overall film strength properties. Generally, the ratio of the film structure layers is such that the core layer dominates the film structure in terms of its percentage of the entire structure. The core layer should be at least about 33% of the total film structure (e.g., in a three layer film structure, each "A" outer layer comprises 33% by weight of the total film structure, while the core LDPE layer (the "B" layer) comprises 33% by weight of the total film structure). In a three layer film structure, preferably, the core LDPE layer comprises at least about 70% of the total film structure. Additional hidden layers can also be incorporated into the film structures without detriment to the optical properties. For example, tie or intermediate layers comprising, for example, ethylene/vinyl acetate copolymers, ethylene acrylic acid copolymers or anhydride graft-modified polyethylenes can be used, or barrier layers comprising, for example, vinylidene chloride/vinyl chloride copolymers or ethylene vinyl alcohol copolymers can be used. In a more preferred three layer film structure, each "A" outer layer comprises 15% by weight of the total film structure of at least one substantially linear ethylene polymer, and the "B" core layer comprises 70% by weight of the total film structure of LDPE. The multilayer film structure can be oriented and/or irradiated (in any order) to provide a multilayer shrink film structure or a skin package with controlled linear tearability. For the multilayer film structures disclosed herein having improved optical clarity, the LDPE generally has a density from about 0.915 g/cc to about 0.935 g/cc; a melt index ($I_2$) from about 0.1 g/10 minutes to about 10 g/10 minutes; and a melt tension of at least. about 1 gram. For improved optical clarity, the substantially linear ethylene/α-olefin polymer generally has a density from about 0.85 g/cc to about 0.96 g/cc, preferably from about 0.9 g/cc to about 0.92 g/cc; a melt index ($I_2$) from about 0.2 g/10 minutes to about 10 g/10 minutes, preferably from about 05 g/10 minutes to about 2 g/10 minutes; a molecular weight distribution ($M_w/M_n$) not greater than about 3; and a single melting peak as determined using DSC.

The multilayer film structures can also be oxygen permeable either by using the substantially linear ethylene polymers (SLEP) alone in the film, or in combination with other oxygen permeable film layers such as, for example, ethylene/vinyl acetate (EVA) and/or ethylene/acrylic acid (EAA). Of particular interest, for example, are SLEP/EAA/SLEP and LLDPE/SLEP/LLDPE film structures which are replacements for PVC and are well suited for stretch overwrapping various fresh foods, e.g. retail-cut red meats, fish, poultry, vegetables, fruits, cheeses, and other food products destined for retail display and that benefit from access to environmental oxygen or must appropriately respire. These films are preferably prepared as nonshrink films (e.g., without biaxial orientation induced by double bubble processing) with good oxygen permeability, stretchability, elastic recovery and heat seal characteristics, and can be made available to wholesalers and retailers in any conventional form, e.g. stock rolls, as well as be used on conventional packaging equipment.

In another aspect, the multilayer film structures can comprise an oxygen barrier film (e.g., SARAN™, a film made from a polyvinylidene chloride polymer made by The Dow Chemical Company, or EVAL™ resins which are ethylene/vinyl alcohol copolymers made by Eval Company of America, a division of Kuraray of America, Inc., a wholly owned subsidiary of Kuraray Ltd.). Oxygen barrier properties are important in film applications such as packaging primal cuts of meat (i.e., large cuts of meat which are shipped to a specific store for further cutting for specific consumer consumption). As described by Davis et al. in U.S. Pat. No. 4,886,690, the oxygen barrier layer can also be designed as "peelable" to allow removal once the packaged primal cut arrives at the butcher/grocer; a peelable construction or design is particularly useful for "case-ready" vacuum skin packages of individual portions and eliminates the need for repackaging to an oxygen permeable package for blooming to bright red.

The film structures made with both the substantially linear ethylene homopolymers and interpolymers described herein may also be pre-formed by any known method, such as, for example, by extrusion thermoforming, with respect to the shape and contours of the product to be packaged. The benefit of employing pre-formed film structures will be to complement or avoid a given particular of a packaging operation such as augment drawability, reduced film thickness for given draw requirement, reduced heat up and cycle time, etc.

The thickness of the monolayer or multilayer film structures may vary. However, for both the monolayer and multilayer film structures described herein, the thickness is typically from about 0.1 mils (2.5 micrometers) to about 50 mils (1270 micrometers), preferably from about 0.4 mils (10 micrometers) to about 15 mils (381 micrometers), and especially from about 0.6 mils (15 micrometers) to about 4 mils (102 micrometers).

Film structures made from both the substantially linear ethylene interpolymers and homopolymers described herein (as well as pellets of substantially linear ethylene polymers) will show surprisingly more efficient irradiation crosslinking as compared to a comparative conventional Ziegler polymerized linear ethylene/α-olefin polymer. As one aspect of this invention, by taking advantage of the irradiation efficient of these unique polymers, it possible the prepare film structures with differentially or selectively crosslinked film layers. To take further advantage of this discovery, specific film layer materials including the present substantially linear ethylene polymers can be formulated with pro-rad agents, such as triallyl cyanurate as described by Warren in U.S. Pat. No. 4,957,790, and/or with antioxidant crosslink inhibitors, such as butylated hydroxytoluene as described by Evert et al. in U.S. Pat. No. 5,055,328.

Irradiation crosslinking is also useful for increasing the shrink temperature range and the heat seal range for the film structures. For example, U.S. Pat. No. 5,089,321, incorporated herein by reference, discloses multilayer film structures comprising at least one heat sealable outer layer and at least one core layer which have good irradiation crosslinking performance. Among irradiation crosslinking technologies, beta irradiation by electron beam sources and gamma irradiation by a radioactive element such as Cobalt 60 are the most common methods of crosslinking film materials.

In an irradiation crosslinking process, a thermoplastic film is fabricated by a blown film process and then exposed to an irradiation source (beta or gamma) at an irradiation dose of up to 20 Mrad to crosslink the polymeric film. Irradiation crosslinking can be induced before or after final film orientation whenever oriented films are desired such as for shrink and skin packaging, however, preferably irradiation crosslinking is induced before final orientation. When heat-shrinkable and skin packaging films are prepared by a process where pellet or film irradiation precedes final film orientation, the films invariably show higher shrink tension and will tend yield higher package warpage and board curl; conversely, when orientation precedes irradiation, the resultant films will show lower shrink tension. Unlike shrink tension, the free shrink properties of the substantially linear ethylene polymers of the present invention are essentially unaffected by whether irradiation precedes or follows final film orientation.

Irradiation techniques useful for treating the film structures described herein include techniques known to those skilled in the art. Preferably, the irradiation is accomplished by using an electron beam (beta) irradiation device at a dosage level of from about 0.5 megarad (Mrad) to about 20 Mrad. Shrink film structures fabricated from the substantially linear polymers as described herein are also expected to exhibit improved physical properties due to a lower degree of chain scission occurring as a consequence of the irradiation treatment.

The olefin packaging and wrapping films of this invention, and the methods for preparing them, are more fully described in the following examples. The substantially linear ethylene polymers used in the following examples were prepared as described in U.S. patent applications U.S. Ser. No. 07/776,130 (now U.S. Pat. No. 5,272,236, issued Dec. 21, 1993) and U.S. Ser. No. 07/939,281 (now U.S. Pat. No. 5,278,272, issued Jan. 11, 1994).

TABLE 1

Physical Properties of Biaxially Oriented Simple Bubble Monolayer Films*

| Film | Resin Type | Density (g/cc) | Melt Index** (g/10 min.) | $I_{10}/I_2$ Ratio | PI (kpoise) | 1% Secant Modulus, kPa | Tensile Strength, MPa | Toughness (kJ/m²) | Puncture (Kg-cm/mil) |
|---|---|---|---|---|---|---|---|---|---|
| A | ULDPE | 0.912 | 1.0 | 8.2 | 13.6 | 145,168 | 38.6 | 1,172 | 4.9 |
| B | SLEP | 0.915 | 1.0 | 10.4 | 8.2 | 156,836 | 47.6 | 1,559 | 5.6 |
| C | SLEP | 0.912 | 1.0 | 10.2 | 9.3 | 136,462 | 46.8 | 1,391 | 5.7 |
| D | SLEP | 0.902 | 1.0 | 8.8 | 4.1 | 79,137 | 57.7 | 1,260 | 6.9 |

*All films fabricated at a 2.5:1 BUR, except Film D which was fabricated at a 3.0:1 BUR. ULDPE denotes ultra low density polyethylene and SLEP denotes substantially linear ethylene polymer.
**Melt Index values at ± 0.1 g/10 minutes.

EXAMPLES

Example 1

Samples A–K are all simple bubble blown films. Samples A, E and F are comparative samples only and are not examples of the invention. To prepare the films, resin samples were extruded on a 2.5 inch (6.35 cm) diameter Gloucester extruder equipped with a 6 inch (15.2 cm) annular die. Output rate was targeted at 120 or 150 lbs/hr. (54.5 or 68.2 kg/hr.) and melt temperature was targeted at 440° F. (227° C.). Film blow-up ratio (BUR) was varied at 2.5:1, 3.0:1 and 3.5:1 and films were prepared at 1 and 2 mils. Film tensile and toughness properties were obtained in accordance to ASTM D-882, Procedure A where toughness was taken as the integration of the area under the stress-strain curve. 1% secant modulus values were obtained in accordance with ASTM D-638. The secant modulus, tensile strength and toughness data are all reported as the average of machine and transverse direction single determinations for each respective film.

The puncture values were obtained using an Instron tensiometer. A hemispherical 12.5 mm diameter aluminum probe was used at 250 mm/min. deformation rate to exaggerate ordinary abuse.

The ULDPE film material is a commercial ethylene/1-octene linear copolymer polymerized using a conventional Ziegler catalyst and is sold by The Dow Chemical Company under the tradename of ATTANE 4201. All of the substantially linear ethylene polymers in Table 1 are ethylene/1-octene interpolymers polymerized from novel constrained geometry catalyst.

All films made from novel substantially linear ethylene polymers exhibit improved toughness, tensile strength and puncture resistance properties that are highly desired for heat-shrink, stretch wrap, vacuum form and skin packaging of food and nonfood items.

TABLE 2

Free Shrinkage of Biaxially Oriented Simple Bubble Monolayer Films

| Film | Resin Type | Density (g/cc) | Melt Index, 190° C.** (g/10 min.) | Thickness (Mils) | Blow Up Ratio | Percent Free Shrinkage Machine Direction | Percent Free Shrinkage Transverse Direction |
|---|---|---|---|---|---|---|---|
| A | ULDPE* | 0.912 | 1.0 | 2.0 | 2.5:1 | 65 | −22 |
| E | ULDPE | 0.912 | 1.0 | 1.0 | 3.5:1 | 75 | 0 |
| F | LLDPE | 0.920 | 1.0 | 1.0 | 3.0:1 | 74 | −8 |
| D | SLEP | 0.902 | 1.0 | 2.0 | 2.5:1 | 75 | 3 |
| G | SLEP | 0.902 | 1.0 | 1.0 | 3.0:1 | 80 | 13 |
| H | SLEP | 0.902 | 1.0 | 1.0 | 3.5:1 | 80 | 30 |
| I | SLEP | 0.911 | 1.0 | 1.0 | 3.5:1 | 79 | 28 |
| J | SLEP | 0.920 | 1.0 | 1.0 | 3.0:1 | 79 | 11 |
| K | SLEP | 0.920 | 1.0 | 1.0 | 3.5:1 | 79 | 26 |

*ULDPE denotes ultra low density polyethylene, LLDPE denotes linear low density polyethylene and SLEP denotes substantially linear ethylene polymer.
**Melt Index values at ± 0.1 g/10 minutes.

Free shrink properties of the films was determined by cutting four inch by four inch (10.2 cm×10.2 cm) samples from each of the fabricated film samples and carefully placing them flat into the bottom of silicone-coated metal pans. The metal pans had sides 1 inch (2.5 cm) high and were well-coated with 200 centipoise silicone oil. The pans containing the film samples were then placed into a forced-air convection oven at 135° C. for ten minutes. After ten minutes, the pans were removed from the oven and allowed to cool to ambient. After cooling, the film samples were removed and the dimensions in both the machine and transverse directions were measured. The percent free shrinkage was determined as described in ASTM D-2732.

Table 2 shows the novel substantially linear ethylene polymers exhibits excellent heat-shrink characteristics making them suitable as shrink films and bags for food and nonfood items such as papergoods.

Example 2

Table 3 lists the samples used in the following packaging film examples. Comparative polymer samples 1 and 2 are heterogeneously branched linear low density polyethylene (LLDPE) polymers produced by a conventional high efficiency Ziegler type catalyst. Comparative sample 5 is a low density polyethylene (LDPE) produced under high pressure/free radical polymerization. Samples 3 and 4 are substantially linear ethylene interpolymers produced using a constrained geometry catalyst. Comparative sample 6 is a commercially available high clarity shrink film, Clysar™ XEH 921, sold by E. I. du Pont de Nemours Company.

Table 4 lists the critical shear stress at onset of gross melt fracture for comparative examples 1 and 2 and for examples 3 and 4.

TABLE 3

Samples For Shrink Film Performance Comparison

| Sample | Polymer | Density (g/cc) | $I_2$ (g/10 min) | $I_{10}/I_2$ | $M_w/M_n$ | Catalyst | DSC Melting Point** (C.) |
|---|---|---|---|---|---|---|---|
| 1* | Ethylene/1-octene | 0.92 | 1 | 8.5 | 3.8 | Ziegler | 121 |
| 2* | Ethylene/1-octene | 0.902 | 0.98 | 8.3 | 3.57 | Ziegler | 121 |
| 3 | Ethylene/1-octene | 0.902 | 0.93 | 8.8 | 2.1 | Constrained geometry | 95 |
| 4 | Ethylene/1-octene | 0.902 | 1.03 | 8.5 | 2.09 | Constrained geometry | 95 |
| 5* | LDPE | 0.923 | 1.9 | NM | NM | High pressure/free radical | 110 |
| 6* | Clysar XEH 921*** | NM | NM | NM | NM | NM | 121 |

*Comparative Sample Only; not an example of the invention
**Second heat, 10 C./min.
***Biaxially Oriented Crosslinked Film Sample, 1.5 mils thickness
NM = Not Measured

TABLE 4

| Example | Critical shear stress at OGMF** (dynes/cm$^2$) |
|---|---|
| 1* | 3.64 × 10$^6$ |
| 2* | 3.42 × 10$^6$ |
| 3 | 4.31 × 10$^6$ |

TABLE 4-continued

| Example | Critical shear stress at OGMF** (dynes/cm²) |
|---|---|
| 4 | 4.31 × 10⁶ |

*Comparative Sample Only; not an example of this invention
**Onset of gross melt fracture Samples 1, 2, and 4 were simple bubble fabricated on a 2.5 inch (6.4 cm) diameter Gloucester extruder equipped with a 6 inch (15.2 cm) annular die. A target output rate of 150 lbs/hr., 440° F. (227° C.) target melt temperature and 3:1 blow up ratio are used resulting in a film thickness of about 1 mil. The optical properties are measured as described in ASTM D-1746, D-1003, and D-2457, the disclosures of each of which are incorporated herein by reference.

Table 5 compares the optical properties, i.e., clarity, gloss, and percent film haze as well as the free shrink characteristics of films made from substantially linear ethylene interpolymers versus films made from ethylene/α-olefin copolymers made using a Ziegler catalyst. Whereas the inventive Sample 4 exhibited transverse directional (TD) shrink, a desirable shrink film property, comparative samples 1 and 2 exhibit undesirable TD expansion. Furthermore, the film fabricated from the inventive Sample 4 exhibited superior overall optical properties (as measured by higher 20° gloss and lower percent haze) relative to comparative samples 1 and 2.

TABLE 5

| Sample | Clarity (% Transmission) | 20° Gloss | Haze (%) | Free Shrink at 135 C. (%) MD | Free Shrink at 135° C. (%) TD |
|---|---|---|---|---|---|
| 1* | 72.8 | 93.5 | 5.2 | 73.8 | −7.9 |
| 2* | 28.5 | 85.7 | 3.6 | 71.0 | −9.9 |
| 4 | 73.2 | 125 | 1.2 | 80.2 | 9.4 |

*Comparative sample only; not an example of the invention

Example 3

Sample 3 and comparative sample 5 were processed as described in Example 2, except the target melt temperature was 390° F. (224° C.) and the target blow-up ratio (BUR) was 3.5:1. The resultant 1.0 mil thick film samples are compared with comparative sample 6 with respect to percent film haze, tensile properties, free shrink and shrink tension. The shrink tensions were measured at the DSC melting point (shown in Table 3) of the polymers, since tension measurement at respective melting points are known to yield the maximum, most severe instance of film shrink tensions.

As shown in Table 6, comparative sample 5 exhibits adequate free shrink properties, yet its optical and tensile properties do not meet the desired performance levels for industrial (transit) or retail packaging. Comparative sample 6 exhibits superior optical, free shrink and tensile properties, however for shrink or skin packaging of delicate or warp sensitive goods, the high shrink tension exhibited by this film is excessive. The Inventive Sample 3 exhibits an excellent combination of superior optics, good tensile properties, good free shrink and low shrink tension.

Comparative Example 4

A blend of 75 percent by weight (based on the final blend) of an ethylene/1-octene copolymer having a melt index ($I_2$) of about 1 g/10 minutes and a density of about 0.92 g/cc produced by Ziegler catalysis and 25 percent (by weight of the final blend) of a LDPE having a melt index (I2) of about 1.9 g/10 minutes and a density of about 0.923 g/cc produced by a high pressure/free radical polymerization process was fabricated into film on a 2.5 inch (6.4 cm) diameter Gloucester film line at a blow-up ratio (BUR) of 3:1, a melt temperature of 227° C., a die gap of 70 mils and a film thickness of about 1 mil. The percent free shrink properties were measured at 135° C. in both the machine (MD) and transverse (TD) directions as described earlier. The film had MD shrink of about 74.8% and TD shrink of about −9.4%, thereby demonstrating that this film, which employs LDPE for enhanced shrink characteristics, actually shows undesirable TD expansion.

Example 5 and Comparative Example 6

Example 5 is a substantially linear ethylene/1-octene copolymer having a density of 0.900 g/cc, a melt index ($I_2$) of about 0.8 g/10 minutes, a molecular weight distribution ($M_w/M_n$) of about 2.2, and a melt flow ratio ($I_{10}/I_2$) of about 8.5. Comparative Example 6 is a heterogeneously branched LLDPE ethylene/1-octene copolymer having a density of 0.905 g/cc, a melt index ($I_2$) of about 0.8, a molecular weight distribution ($M_w/M_n$) of about 3.5 and a melt flow ratio ($I_{10}/I_2$) of about 8. Sample pellets of these copolymer examples were exposed to electron beam radiation at E beam Services, Inc. (Canterbury, N.J.) and tested for crosslink density as measured by percent gel in xylene in accordance with ASTM D-2765 and as described by Chum et al. in U.S. Pat. No. 5,089,321, the disclosure of which is incorporated herein by reference.

TABLE 6

| Sample | 20° Gloss | Haze (%) | Ult. Tensile (lb/in²) MD | Ult. Tensile (lb/in²) TD | Free Shrink (%) MD | Free Shrink (%) TD | Shrink Tension* (g/in) MD | Shrink Tension* (g/in) TD |
|---|---|---|---|---|---|---|---|---|
| 3 | 107 | 2.7 | 9367 | 8616 | 79.8 | 30.3 | 12 | <3*** |
| 5** | 66 | 6.0 | 3584 | 3332 | 81 | 29 | 15 | <3*** |
| 6** | 117 | 3.5 | 14151 | 13049 | 72 | 71 | 168 | >200 |

*Measured at the DSC melting point of the polymer sample
**Comparative sample only; not an example of this invention
***Values are too low to be accurately determined using the 200 gm load cell

TABLE 7

| Radiation Exposure (Mrad) | Example 5 (% gel) | Comparative Example 6 (% gel) |
| --- | --- | --- |
| 0 | 0 | 0 |
| 5.0 | 58 | 49 |

As the data in Table 7 demonstrate, a higher cross-link density is achieved more efficiently for irradiated substantially linear ethylene polymer pellets (Inventive Example 5) relative to pellets of a heterogeneously branched LLDPE having a comparable density, melt index and melt flow ratio.

Inventive Examples 7 and 8, and Comparative Examples 9 and 10

In another experiment, samples of sheeting (18.5±1.5 mil thick) of the same substantially linear copolymer as was mentioned in Example 5 is irradiated at E Beam Services, Inc. at a dosage of 0 and 2.5 Mrad and subsequently biaxially stretched using a T. M. Long laboratory biaxial stretching frame. The stretching temperature utilized was a temperature below the DSC melting point of the copolymer but 5 C. above the temperature at which tearing of the sheet occurs during stretching. These samples are described as Examples 7 and 8, respectively, for 0 and 2.5 Mrad dosage. Samples of sheeting (18.5±1.5 mil thick) of the same linear heterogeneous copolymer as described in comparative example 6 were also irradiated at 0 and 2.5 Mrad and subsequently biaxially stretched with the laboratory stretching frame as described above. These samples are described as comparative examples 9 and 10, respectively. Clear, low haze films resulted after irradiation that were tested for free shrink at 95° C. as described in Example 1. Table 8 summarizes the data as well as provides information indicating how the films were uniformly stretched using the T. M. Long stretching frame:

TABLE 8

| Sample | Stretching Temperature *(C.) | Stretch Ratio | Free Shrink (%) MD | Free Shrink (%) TD |
| --- | --- | --- | --- | --- |
| Inventive Example 7 | 88 | 3 × 3 | >35 | >35 |
| Inventive Example 8 | 88 | 4 × 4 | >35 | >35 |
| Comparative Example 9 | 97 | 4 × 4 | <25 | <25 |
| Comparative Example 10 | 97 | 4 × 4 | <25 | <25 |

The data in Table 8 show that the sheets fabricated from a substantially linear ethylene polymer exhibit superior shrink performance over comparable sheets fabricated from a conventional, heterogeneous linear ethylene polymer. The superior shrink performance is exhibited even when the amount of biaxial stretching is significantly lower for the Inventive Examples relative to the comparative examples. The Inventive Example even shows superior free shrink performance irregardless of whether the comparative examples were irradiated or nonirradiated prior to orientation (stretching).

Inventive Example 11 and Comparative Example 12

Enhanced Optical Properties of Multilayer Films

Three layer film structures are made using different ethylene polymers in each layer. The film structures are made on a blown film coextrusion line. Layer "A" is extruded using a 2.5 inch (6.4 cm) diameter Egan extruder equipped with a single flighted screw having two Egan-type mixing sections; layer "B" is extruded using a 2.5 inch (6.4) diameter Egan extruder equipped with a single flighted screw having two Maddock type mixing sections; and layer "C" is extruded using a 2 inch (5.1 cm) diameter Egan extruder equipped with a single flighted screw having one Maddock type mixing section. The total configuration is set for a target output of about 150 pounds/hour. The weight output ratios of the extruders is targeted at 15%/70%/15% for the A/B/C extruders. Polymer melt temperatures are targeted at 415° F./450° F./425° F. (239° C./261° C./246° C.) for layers A/B/C, respectively. A 70 mil die gap is used for the eight inch (20.3 cm) die. Films are blown to a 3.5:1 blow-up ratio (BUR) to produce 1.25 mil thick multilayer films. Frost line height is about 20 inches (51 cm) Gloss, haze, and clarity are tested in accordance with ASTM D-1746, ASTM D-1003, and ASTM D-2457, respectively. Table 9 summarizes the physical properties of the polymers used in the various layers:

TABLE 9

| Polymer | Polymer Type | Melt Index (g/10 min.) | Density (g/cc) | $I_{10}/I_2$ | $M_w/M_n$ |
| --- | --- | --- | --- | --- | --- |
| 1 | LDPE | 0.7 | 0.9235 | NM | NM |
| 2 | Substantially Linear Ethylene 1-Octene Copolymer | 1.0 | 0.9 | 8.95 | 2.15 |

NM = Not Measured

The multilayer film structures and their respective optical properties are identified in Table 10:

TABLE 10

| Example | Polymers used in the Film Structure (A/B/A) | 20° Gloss | Haze (%) |
| --- | --- | --- | --- |
| 11 | 2/1/2 | 111.6 | 2.7 |
| 12* | 1/1/1 | 34.5 | 10.1 |

*Comparative Example Only; not an example of this invention

As the data in Table 10 show, multilayer film structures made using the substantially linear ethylene/alpha-olefin polymer as the outer layer of the film, with LDPE used as a core or hidden layer, have surprisingly good optical properties versus a multilayer film structure made using the LDPE alone as all three layers. Thus, by coextruding thin outer layers of a substantially linear ethylene polymer onto a LDPE core layer, the resultant film structure exhibits highly favorable optical properties.

Inventive Example 13 and Comparative Examples 14–19

Superior Elastic Recovery

In another experiment, four commercially available meat wrap films were obtain and simple bubble blown films (1 mil thick) from one representative substantially linear ethylene 1-octene copolymer and two conventional, heterogeneous linear ethylene 1-octene copolymers were prepared on an extrusion line equipped with a 3 inch (7.6 cm) die and a 2 inch (5.1 cm) diameter screw at conditions similar to those described in Example 3 of U.S. Pat. No. 5,089,321 and at a blow-up ratio (BUR) of 2.5:1. The descriptions of the substantially linear ethylene copolymer and the two conventional ethylene copolymers are provided in Table 11 and the descriptions of the commercial meat wrap films are provided in Table 12.

TABLE 11

| Example | Density (g/cc) | Melt Index (g/10 min.) | $I_{10}/I_2$ | $M_w/M_n$ |
|---|---|---|---|---|
| 13† | 0.902 | 1.0 | 7.25 | 2.2 |
| 14* | 0.905 | 0.8 | 8.7 | 5.0 |
| 15* | 0.900 | 1.0 | 9.2 | 5.2 |

†Substantially Linear ethylene/1-octene copolymer; an inventive example.
*Conventional linear ethylene/1-octene copolymer; comparative example and not an example of this invention.

TABLE 12

| Example | Film Type | Supplier |
|---|---|---|
| 16 | PVC | Borden Inc. |
| 17 | EVA-based | Mitsubishi Petrochemical Co. of Japan; trademark YUKA WRAP |
| 18 | EVA-based | Asahi Chemical Co. of Japan; trademark SUNTEC C-100. |
| 19 | EVA/EP elastomer | Asahi Chemical Co. of Japan; trademark SUNTEC C-400. |

The elastic recovery of the seven films listed in Tables 11 and 12 were determined by a Tensile Hysteresis Test (ASTM D-412). The test procedure is as follows:

1. Mount a 1" wide, 0.5 to 1 mil thick film on an Instron with a gauge length set for 2 inches (5.1 cm).
2. Stretch the film on the Instron to 25% elongation, then allow the film to snap back by returning the Instron crosshead to its original position until the load cell reads zero.
3. Measure the unrecoverable strain and calculate the percent film recovery at 25% film elongation.
4. Repeat the experiment at 50% film elongation to measure the percent film recovery at 50% film elongation.

The percent recovery data for Inventive Example 13 and comparative examples 14–19 are shown in Table 13. The data clearly show that the film made from the substantially linear ethylene polymer is well suited for stretch wrap packaging applications due to its excellent elastic recovery relative to conventional LLDPE films and commercial meat wrap films at both 50% and 25% elongation.

TABLE 13

| Example | Elastic Recovery at 50% Elongation | Elastic Recovery at 25% Elongation |
|---|---|---|
| 13 | 88 | 91 |
| 14* | 74 | NM |
| 15* | 80 | 82 |
| 16* | 77 | 82 |
| 17* | 82 | 88 |
| 18* | 76 | 86 |
| 19* | 60 | 78 |

*Comparative Example; not an example of this invention
NM = not measured

Inventive Example 20 and Comparative Examples 21–23

Skin Packaging Evaluation

In another experiment, 5 mil film was fabricated from one substantially linear ethylene polymer, two conventional heterogeneous linear ethylene polymers and a Surlyn ionomer supplied by E. I. du Pont. The physical properties, including film optics and abuse or implosion resistance properties such as ultimate tensile strength and toughness, of the resultant films are shown in Table 14:

TABLE 14

| Example | Polymer | $I_2$ (g/10 min) | Density (g/cc) | Vicat Softening (C.) | Ultimate Tensile (MPa) | Toughness (kJ/m$^2$) | 20 Degree Gloss |
|---|---|---|---|---|---|---|---|
| ASTM Test Method | | D 1238 190 C./2.16 kg | D 792 | D 1525 | D 882 | D 822 | D 2457 |
| 20 | SLEP | 1.0 | 0.908 | 94.3 | 51.4 | 3,249 | 119.2 |
| 21 | ULDPE | 1.0 | 0.912 | 95.3 | 40.0 | 2,765 | 55.9 |
| 22 | ULDPE | 0.8 | 0.905 | 82.5 | 31.4 | 2,040 | 55.3 |
| 23 | Ionomer | 1.3 | NM | 76.5 | 36.3 | 2,219 | 84.6 |

The films listed in Table 14 were also used in a skin packaging evaluation using an Ampak Shipmate II skin packaging machine and porous 24 point solid bleached sulfate (SBS) paperboard primed with an ionomer aqueous dispersion. While pre-heat times were varied in the evaluation, heat time was 5 seconds, cool time was 5 seconds, stand-by heater was at 15% and packaging vacuum was at 80%. Comparative determinations were made for cycle time, board adhesion and vacuum forming (drawability). For various films, cycle time (time to double droop, or time the film is molten enough to begin a packaging cycle) was determined at 21 and 23 second pre-heat times. The adhesion of the films to the paperboard was determined at several pre-heat times by pulling the film from the paperboard with an Instron tensiometer using a 20 kg load setting and a crosshead speed of 25 cm/min. Adhesion testing was performed at least 24 hrs. after blank packages were prepared. For the adhesion test, the samples were cut into four 1×5 inch (2.5 cm×12.7 cm) strips. After a section of the film was peeled from the board, the board was bent 90 degrees and placed in the lower jaw and the film in the upper jaw of the Instron. Adhesion observation and/or measurements were taken once a 180 degree peel began. Drawability was assessed by packaging two 3 inch×2.5 inch O.D. (7.6 cm×6.4 cm O.D.) PVC pipes separated 6 inches (15.2 cm) on the board and standing upright, taking observation regarding package tightness, whether a hole developed at the center of a pipe, as well as by quantifying ridges for each pipe and/or bridge height between the two pipes that developed. Ridges typically occur around the base of a pipe and are manifested as wrinkles. Bridging occurs due to incomplete drawdown to the board. Table 15 summarizes the skin packaging results.

TABLE 15

| Example | Cycle Time at 23 sec Pre-Heat (sec) | Cycle Time at 21 sec Pre-Heat (sec) | Board Adhesion at 13 sec Pre-Heat (kg/cm) | Board Adhesion at 23 sec Pre-Heat (kg/cm) | Ridge Count for Packaged PVC Pipe | Bridge Height for Packaged PVC Pipe (cm) |
|---|---|---|---|---|---|---|
| 20 | 18 | 17 | FT | FT | 8 | 0.3 |
| 21 | NM | 19 | FT | NM | 13 | 0.3 |
| 22 | NM | 18 | FT | NM | 10 | 0.5 |
| 23 | 18 | 16 | FT | 0.19 | 11 | 0.3 |

NM = not measured
FT = fiber tear which is the desired level of excellent, inseparable adhesion The data in Table 15 show that skin packaging cycle time of the film made from the substantially linear ethylene polymer is surprisingly equivalent to the Surlyn ionomer film and the lower density conventional linear ethylene polymer, even though both comparative film material possess significantly lower Vicat softening points and the ionomer is known to have more infra-red heat bands than nonpolar ethylene polymers. Also, surprisingly, the unique substantially linear ethylene polymer film exhibited better board adhesion at higher pre-heat times than the ionomer film. This performance is particularly surprising since the SBS board was primed with an ionomer aqueous dispersion and is advertised for sale as "primed/coated for Surlyn". This result is even more surprising given the nonpolar nature of the substantially linear ethylene polymer and the known tendency for nonpolar polymers to exhibit poor adhesion to polar substrates such as the Surlyn dispersion coating. In addition to unexpected cycle time and adhesion performance, Table 15 also shows the substantially linear ethylene polymer film exhibited better drawability or formability than the ionomer film and films made from conventional linear ethylene polymers as exemplified by less packaging defects or wrinkles.

We claim:

1. A monolayer heat-shrinkable, flexible biaxially oriented film comprising an ethylene polymer and having free shrink in both the machine and transverse directions, wherein the ethylene polymer is at least one substantially linear ethylene polymer which is characterized as having:

(A) a melt flow ratio, $I_{10}/I_2$, $\geq 5.63$, (B) a molecular weight distribution, $M_w/M_n$, defined by the equation:

$$M_w/M_n \leq (I_{10}/I_2) - 4.63, \text{ and}$$

(C) a gas extrusion rheology such that the critical shear rate at onset of surface melt fracture for the substantially linear ethylene polymer is at least 50 percent greater than the critical shear rate at the onset of surface melt fracture for a linear olefin polymer, wherein the linear olefin polymer has a homogeneously branched short chain branching distribution and no long chain branching, wherein the substantially linear ethylene polymer and the linear olefin polymer are simultaneously ethylene homopolymers or interpolymers of ethylene and at least one $C_3–C_{20}$ α-olefin and have essentially the same $I_2$ and $M_w/M_n$ and wherein the respective critical shear rates of the substantially linear ethylene polymer and the linear olefin polymer are measured at the same melt temperature using a gas extrusion rheometer.

2. The film defined in claim 1 wherein the substantially linear ethylene polymer has a density from about 0.86 g/cc to about 0.93 g/cc.

3. The film defined in claim 2 wherein the substantially linear ethylene polymer has a density from about 0.88 g/cc to about 0.92 g/cc.

4. The film defined in claim 1 wherein the film, when measured as a simple bubble film, has a 1% secant modulus of less than about 195,000 kPa.

5. The film defined in claim 4 wherein the film, when measured as a simple bubble film, has a 1% secant modulus of less than about 184,000 kPa.

6. The film defined in claim 1 wherein the film has a shrinkage value of from about 18% to 85% at 135° C. in at least one direction when fabricated at a simple bubble blow-up ratio of 3.5:1.

7. The film defined in claim 1 wherein the substantially linear ethylene polymer has a melt index (MI), as measured by ASTM D-1238, Condition 190° C./2.16 kg, from about 0.1 g/10 minutes to about 10 g/10 minutes.

8. The film defined in claim 7 wherein the substantially linear ethylene polymer has a melt index (MI), as measured by ASTM D-1238, Condition 190° C./2.16 kg, from about 0.4 g/10 minutes to about 5 g/10 minutes.

9. The film defined in claim 1 wherein the film consists essentially of said substantially linear ethylene polymer.

10. The film defined in claim 1 wherein the substantially linear ethylene polymer is blended with an ethylene/vinyl acetate copolymer.

11. The film defined in claim 1 wherein the substantially linear ethylene polymer is blended with an ultra low density polyethylene.

12. The film defined in claim 1 wherein the film is crosslinked.

13. The film defined in claim 12 wherein the is crosslinked by irradiation.

14. The film defined in claim 1 wherein the film is heat sealable to itself.

15. The film defined in claim 1 wherein the film is biaxially oriented as a tube.

16. The film defined in claim 1 wherein the film is biaxially oriented at a temperature below the melting point of the substantially linear ethylene linear polymer.

17. The film defined in claim 1 wherein the substantially linear ethylene polymer is an ethylene homopolymer.

18. The film defined in claim 1 wherein the substantially linear ethylene polymer is an ethylene interpolymer with at least one α-olefin of 3 to 20 carbon atoms.

19. The film defined in claim 18 wherein the substantially linear ethylene polymer is an ethylene/α-olefin copolymer.

20. The film defined in claim 19 wherein the ethylene/α-olefin copolymer is an ethylene/1-butene copolymer.

21. The film defined in claim 19 wherein the ethylene/α-olefin copolymer is an ethylene/1-hexene copolymer.

22. The film defined in claim 19 wherein the ethylene/α-olefin copolymer is an ethylene/4-methyl-1-pentene copolymer.

23. The film defined in claim 19 wherein the ethylene/α-olefin copolymer is an ethylene/1-octene copolymer.

24. A monolayer heat-shrinkable, puncture resistant, biaxially oriented film suitable for use in fabricating bags for packaging food articles, wherein the film comprises an ethylene polymer and has free shrink in both the machine and transverse directions and wherein the ethylene polymer is at least one substantially linear ethylene polymer which is characterized as having:

(A) a melt flow ratio, $I_{10}/I_2$, $\geq 5.63$, (B) a molecular weight distribution, $M_w/M_n$, defined by the equation:

$$M_w/M_n \leq (I_{10}/I_2) - 4.63, \text{ and}$$

(C) a gas extrusion rheology such that the critical shear rate at onset of surface melt fracture for the substantially linear ethylene polymer is at least 50 percent greater than the critical shear rate at the onset of surface melt fracture for a linear olefin polymer, wherein the linear olefin polymer has a homogeneously branched short chain branching distribution and no long chain branching, wherein the substantially linear ethylene polymer and the linear olefin polymer are simultaneously ethylene homopolymers or interpolymers of ethylene and at least one $C_3$–$C_{20}$ α-olefin and have essentially the same $I_2$ and $M_w/M_n$ and wherein the respective critical shear rates of the substantially linear ethylene polymer and the linear olefin polymer are measured at the same melt temperature using a gas extrusion rheometer.

25. The film defined in claim 24 wherein the substantially linear ethylene polymer has a density from about 0.86 g/cc to about 0.93 g/cc.

26. The film defined in claim 25 wherein the substantially linear ethylene polymer has a density from about 0.88 g/cc to about 0.92 g/cc.

27. The film defined in claim 24 wherein the film, when measured as a simple bubble film, has a 1% secant modulus of less than about 195,000 kPa.

28. The film defined in claim 24 wherein the film has a shrinkage value of from about 18% to about 85% at 135° C. in at least one direction when fabricated at a simple bubble blow-up ratio of 3.5:1.

29. The film defined in claim 24 wherein the substantially linear ethylene polymer has a melt index (MI), as measured by ASTM D-1238, Condition 190° C./2.16 kg, from about 0.1 g/10 minutes to about 10 g/10 minutes.

30. The film defined in claim 24 wherein the substantially linear ethylene polymer has a melt index (MI), as measured by ASTM D-1238, Condition 190° C./2.16 kg, from about 0.4 g/10 minutes to about 5 g/10 minutes.

31. The film defined in claim 24 wherein the film consists essentially of the substantially linear ethylene polymer.

32. The film defined in claim 24 wherein the substantially linear ethylene polymer is blended with at least one ethylene/vinyl acetate copolymer.

33. The film defined in claim 24 wherein the substantially linear ethylene polymer is blended with an ultra low density polyethylene.

34. The film defined in claim 24 wherein the film is crosslinked.

35. The film defined in claim 34 wherein the film is crosslinked by irradiation.

36. The film defined in claim 24 wherein the substantially linear ethylene polymer is an ethylene homopolymer.

37. The film defined in claim 34 wherein the substantially linear ethylene polymer is an ethylene interpolymer with at least one α-olefin of 3 to 20 carbon atoms.

38. The film defined in claim 37 wherein the substantially linear ethylene polymer is an ethylene/α-olefin copolymer.

39. The film defined in claim 38 wherein the ethylene/α-olefin copolymer is an ethylene/1-butene copolymer.

40. The film defined in claim 38 wherein the ethylene/α-olefin copolymer is an ethylene/1-hexene copolymer.

41. The film defined in claim 38 wherein the ethylene/α-olefin copolymer is an ethylene/4-methyl-1-pentene.

42. The film defined in claim 38 wherein the ethylene/α-olefin copolymer is an ethylene/1-octene copolymer.

43. The film defined in claim 24 wherein the substantially linear ethylene polymer film is biaxially oriented as a tube.

44. The film defined in claim 24 wherein the film is biaxially oriented at a temperature below the melting point of the substantially linear ethylene linear polymer.

45. A monolayer heat-shrinkable film comprising at least one substantially linear ethylene polymer which is an ethylene homopolymer or an interpolymer of ethylene and at least one $C_3$–$C_{20}$ α-olefin comonomer and wherein the substantially linear ethylene polymer is further characterized as having:

(A) a melt flow ratio, $I_{10}/I_2$, $\geq 5.63$, (B) a molecular weight distribution, $M_w/M_n$, defined by the equation:

$$M_w/M_n \leq (I_{10}/I_2) - 4.63, \text{ and}$$

(C) a gas extrusion rheology such that the critical shear rate at onset of surface melt fracture for the substantially linear ethylene polymer is at least 50 percent greater than the critical shear rate at the onset of surface melt fracture for a linear olefin polymer, wherein the linear olefin polymer has a homogeneously branched short chain branching distribution and no long chain branching, wherein the substantially linear ethylene polymer and the linear olefin polymer are simultaneously ethylene homopolymers or interpolymers of ethylene and at least one $C_3$–$C_{20}$ α-olefin and have essentially the same $I_2$ and $M_w/M_n$ and wherein the respective critical shear rates of the substantially linear ethylene polymer and the linear olefin polymer are measured at the same melt temperature using a gas extrusion rheometer, and wherein the film has free shrink in both the machine and transverse directions.

46. A heat-shrinkable biaxially oriented monolayer film, suitable for use in fabricating bags for packaging food articles, comprising at least one substantially linear ethylene polymer, wherein the substantially linear ethylene polymer is an interpolymer of ethylene and at least one $C_3$–$C_{20}$ α-olefin comonomer and is farther characterized as having:

(A) a melt flow ratio, $I_{10}/I_2, \geq 5.63$, (B) a molecular weight distribution, $M_w/M_n$, defined by the equation:

$$M_w/M_n \leq (I_{10}/I_2) - 4.63, \text{ and}$$

(C) a gas extrusion rheology such that the critical shear rate at onset of surface melt fracture for the substantially linear ethylene polymer is at least 50 percent greater than the critical shear rate at the onset of surface melt fracture for a linear olefin polymer, wherein the linear olefin polymer has a homogeneously branched short chain branching distribution and no long chain branching, wherein the substantially linear ethylene polymer and the linear olefin polymer are simultaneously ethylene homopolymers or interpolymers of ethylene and at least one $C_3$–$C_{20}$ α-olefin and have essentially the same $I_2$ and $M_w/M_n$ and wherein the respective critical shear rates of the substantially linear ethylene polymer and the linear olefin polymer are measured at the same melt temperature using a gas extrusion rheometer, and wherein the film has free shrink in both the machine and transverse directions.

47. The monolayer film of any one of claim 45 or 46, wherein the substantially linear ethylene polymer is further characterized as having:

(E) from 0.01 long chain branches/1000 carbons to 3 long chain branches/1000 carbons.

48. The monolayer film of any one of claim 45 or 46, wherein the substantially linear ethylene polymer is a copolymer of ethylene and 1-octene.

49. The monolayer film of any one of claim 45 or 46, wherein the substantially linear ethylene polymer is blended with at least one other polymer.

50. The monolayer film of claim 49, wherein the other polymer is a linear low density polyethylene.

51. The monolayer film of claim 49, wherein the other polymer is a very low or ultra low density polyethylene.

52. The monolayer film of claim 49, wherein the other polymer is an ethylene/vinyl acetate interpolymer.

53. The monolayer film of any one of claim 45 or 46, wherein the film is further characterized as having less surface melt fracture than a linear ethylene polymer film as viewed under 40× magnification, wherein the linear ethylene polymer has no long chain branching and an melt index, $I_2$, density and $M_w/M_n$ within nine percent of the substantially linear ethylene polymer and wherein both films are fabricated under essentially the same fabrication conditions and wherein the substantially linear ethylene polymer and the linear olefin polymer are simultaneously ethylene homopolymers or interpolymers of ethylene and at least one $C_3$–$C_{20}$α-olefin.

* * * * *